(12) United States Patent
Dolinsky et al.

(10) Patent No.: US 9,767,246 B2
(45) Date of Patent: Sep. 19, 2017

(54) ADJUSTMENT AND COMPENSATION OF DELAYS IN PHOTO SENSOR MICROCELLS

(71) Applicant: General Electric Company, Schenectady, NY (US)

(72) Inventors: Sergei Ivanovich Dolinsky, Clifton Park, NY (US); Chad Jacob Bircher, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 177 days.

(21) Appl. No.: 14/742,307

(22) Filed: Jun. 17, 2015

(65) Prior Publication Data

US 2016/0371419 A1 Dec. 22, 2016

(51) Int. Cl.
*G06F 17/50* (2006.01)

(52) U.S. Cl.
CPC ...... *G06F 17/5081* (2013.01); *G06F 17/5063* (2013.01); *G06F 2217/84* (2013.01)

(58) Field of Classification Search
CPC ............ G06F 2217/84; G06F 17/5081; G06F 17/5063
USPC ........................................................ 716/113
See application file for complete search history.

(56) References Cited

U.S. PATENT DOCUMENTS

| 8,735,831 | B2 | 5/2014 | Zhang et al. | |
| 2005/0006593 | A1* | 1/2005 | Kastella et al. | 250/458.1 |
| 2011/0155898 | A1* | 6/2011 | Burr | G01T 1/1647 250/252.1 |
| 2013/0313414 | A1 | 11/2013 | Pavlov et al. | |
| 2013/0334428 | A1 | 12/2013 | Kim et al. | |
| 2014/0029715 | A1 | 1/2014 | Hansen et al. | |
| 2014/0048711 | A1 | 2/2014 | Henseler et al. | |
| 2015/0041627 | A1* | 2/2015 | Webster | 250/208.2 |

OTHER PUBLICATIONS

Seifert, Stefan et al., "Ultra Precise Timing with SiPM-Based TOF PET Scintillation Detectors", IEEE Nuclear Science Symposium Conference Record, Nov. 3, 2009, (pp. 2329-2333, 5 total pages).

(Continued)

*Primary Examiner* — Suchin Parihar

(57) ABSTRACT

A system and method for compensating signal delay across a solid state photomultiplier. The method including determining respective arrival times of signals from a plurality of microcells of the photomultiplier, calculating a signal transit time delay difference between the respective arrival times for individual signals, correlating the individual transit time delay differences to an amount of respective signal propagation compensation for respective microcells of the photomultiplier, and introducing the respective signal propagation compensation into circuitry of the respective microcells. The method also includes at least one of adjusting a response shape of a photodiode within each of the plurality of microcells, adjusting operating parameters of a one-shot pulse circuit within the microcells, and modifying circuit design values of each microcells during fabrication of the photomultiplier. A non-transitory computer readable medium and a system for implementing the method on a row, column, and/or individual microcell level are disclosed.

20 Claims, 7 Drawing Sheets

(56) References Cited

OTHER PUBLICATIONS

Gascon, David et al., "Fast integrated SiPM readout electronics with high dynamic range", HepTech, http://www.heptech.org/Phocea/Vie_des_labos/Ast/ast_sstechnique.php?id_ast=131, 2010, (pp. 1-2, 2 total pages).

Nagano, T. et al., "Timing Resolution Improvement of MPPC for TOF-PET Imaging", IEEE Nuclear Science Symposium and Medical Imaging Conference, Nov. 16, 2012, (pp. 1577-1580, 4 total pages).

Authors et al.: Disclosed Anonymously, "Readout Scheme for Time-of-Flight Position Emission Tomography Detector", ip.com, https://priorart.ip.com/IPCOM/000226961, Apr. 26, 2013, 11pgs.

Dolinsky, Sergei et al., "Timing Resolution Performance Comparison for Fast and Standard Outputs of SensL SiPM", Nuclear Science Symposium and Medical Imaging Conference, Nov. 21, 2013, IEEE, 6pgs.

\* cited by examiner

OR

ADJUSTMENT AND COMPENSATION OF DELAYS IN PHOTO SENSOR MICROCELLS

BACKGROUND

Radiation detection approaches exist that employ photosensors incorporating a microcell (e.g., a single photon avalanche diodes (SPAD)) operating in Geiger mode. Certain of these approaches have been implemented in large area devices, such as may be used in nuclear detectors. A readout pixel can be made up of an array of microcells, where each individual microcell can be connected to a readout network via a quenching resistor exhibiting resistance between 100 kΩ to 1 MΩ, known as solid state photomultiplier (SSPM), silicon photomultipliers (SiPM), multi-pixel photon counting (MPPC). When a bias voltage applied to the silicon photomultiplier (SiPM) is above breakdown, a detected photon generates an avalanche, the APD capacitance discharges to a breakdown voltage and the recharging current creates a signal.

Typically, the pulse shape associated with a single photo electron (SPE) signal has a fast rise time, followed by a long fall time. When detecting fast light pulse (e.g., on the order of tens of nanoseconds) such signals are aggregated across the numerous microcells forming a pixel of a SiPM device. The resulting pulse shape of the summed signal has a slow rise time (e.g., in the tens of nanoseconds) due to the convolution of single microcell responses with detected light pulse. Therefore, it is difficult to achieve good timing resolution with these devices due to the slow rise time of the aggregated signal for a given light pulse.

Analog SiPMs can have pixel outputs bonded-out by wires attached to the wafer, or by using short vertical interconnects implemented in Through-Silicon-Via (TSV) technology. Microcells can be connected by traces, and typically one or a few pads per array of microcells (pixel) can be used as output (wire bonds or TSV). An analog SiPM typically requires a front-end electronics to buffer (and/or amplify) the signal from the SiPM for further processing. Digital SiPM (dSiPM) technology has front-end electronics built-in to each of microcells to produce a digital output pulse. The microcells of a dSiPM communicate with an external controller having typically high clock speeds.

Due to the difference in actual position of microcells in an array, there can be a significant variation of time delay of pulse propagation across pixels. This variation degrades timing performance of the device. Attempting to equalize trace length by extending certain traces can significantly increase parasitics, and degrade signal pulse shape due to the limited driving capability of the microcell. Extending trace lengths or creating delays by incorporating additional circuits both require dedicating pixel space to these approaches, thus reducing the detector's active area.

DESCRIPTION

In accordance with embodiments, the signal delay across SiPMs (or any type of photosensor having an array of individual microcells with integrated electronics) can be compensated for the source of the delay in the SiPM (e.g., pixel geometry, microcell position, trace length differences, etc.). Embodying approaches can include one or more of adjusting the trigger level of one-shot circuitry triggering on the response of the SPAD, adjusting internal delay of one-shot circuitry, adjusting the width of the one-shot pulse to equalize the timing of each microcells' output pulse's trailing edges, (from which a detector can then sense the photon event), adjust the SPAD response shape by varying quench resistance or other properties of the microcell, and/or modify the pulse shape by adjusting the RC time constant for individual microcells.

In accordance with embodiments, individual microcells of a solid state photomultiplier (SSPM) with integrated microcell electronics can be modified so that the pulse seen at the processing electronics is arriving at about the same time after a photon event trigger microcell regardless of the individual microcell location within a pixel array. This modification can be achieved by effectively leveling the transit time delay to the signal processing circuitry by adjusting one or more properties of the pulse at an individual microcell—i.e., by adjusting components on the microcell electronics (such as one-shot pulse output based on a comparator). Introduction of modified circuitry into the individual microcells can prospectively level the transit time delay based on the expected delay in the transmission lines.

Figure 1:
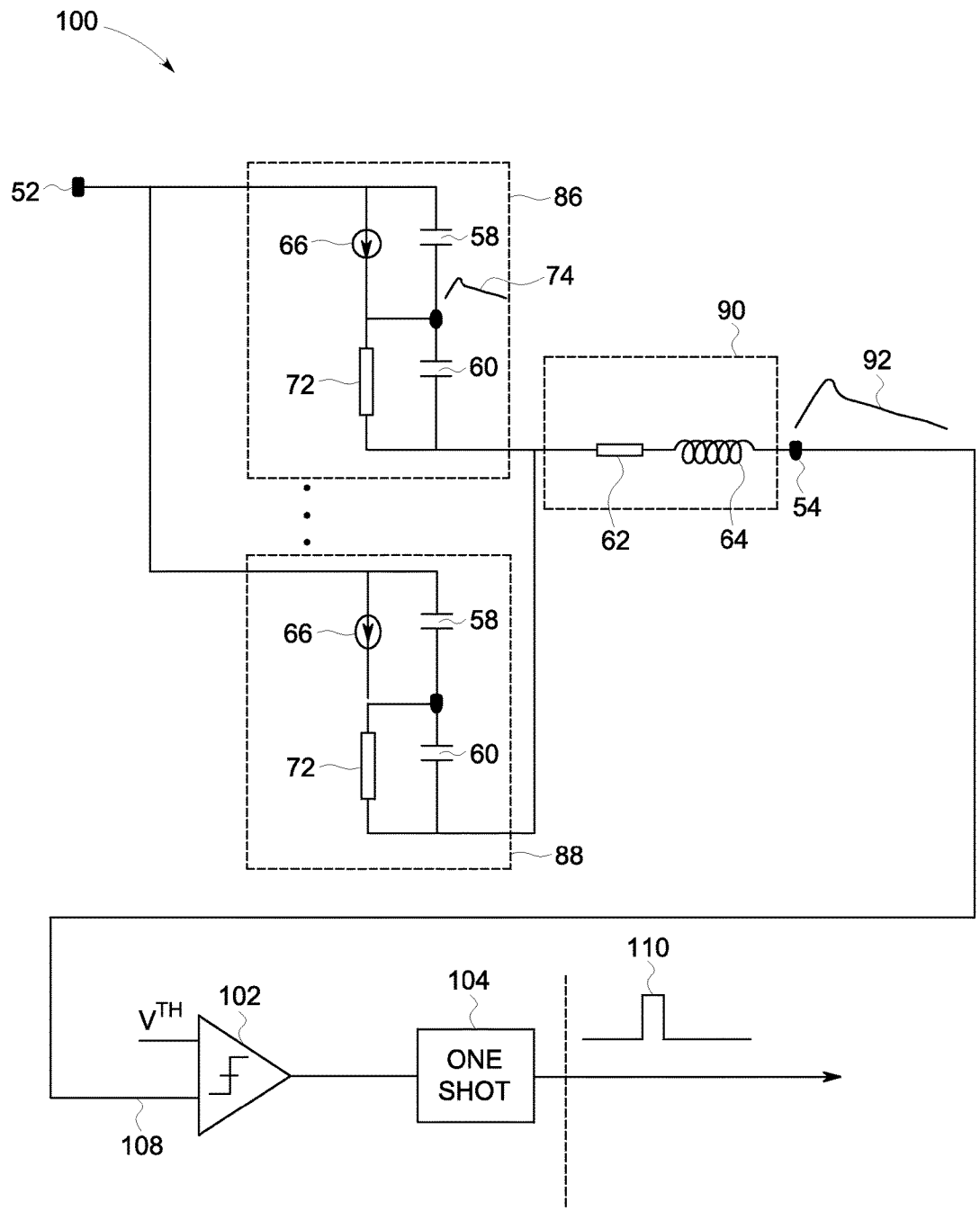
FIG. 1 depicts a conventional silicon photomultiplier pixel and threshold detector circuitry.

FIG. 1 depicts circuit 100 including a conventional silicon photomultiplier pixel and threshold detector circuitry, where a microcell 86 is one of a plurality of microcells 88, within an SiPM array of such cells. In one example, the depicted microcell may be part of an array of single photon avalanche diodes (SPAD) operated in Geiger mode within an analog SiPM. In the depicted example, the model has an associated cathode 52 and anode 54. The microcell portion of the model includes a diode capacitor 58 and a current pulse 66, such as may be associated with a photodiode. Quench circuitry in the depicted example includes quench resistor 72 and parasitic quench capacitor 60. Downstream of the quench circuitry, in this example, circuit trace impedances are modeled as parasitic circuit 90 including parasitic resistor 62 and parasitic inductor 64.

In this model each individual APD of a pixel, such as the depicted microcell, is connected to a readout network via the quenching circuitry, including the quenching resistor (Rq) 72 with typical values between about 100 kΩ to about 1 MΩ. When a detected photon generates an avalanche event, a current pulse 66 is generated and the microcell diode capacitance (Cd) 58 discharges down to the breakdown voltage and the recharging current creates a measureable output signal. The typical pulse shape 92 at anode 54 of a single photo electron (SPE) signal has fast rise time (i.e., a sharp rising edge) followed by a long fall time (i.e., a slow falling tail).

Circuit 100 includes comparator 102, such as a Schmitt trigger, followed by one-shot pulse generator 104 to sense output signal 92 at signal sensing node 108. In the depicted example, comparator 102 compares the signal sensed at the signal sensing node 108 with threshold voltage (Vth). That is, circuit 100 operates in a voltage mode in terms of the determination as to whether the one-shot pulse generator is triggered.

Figure 2A:
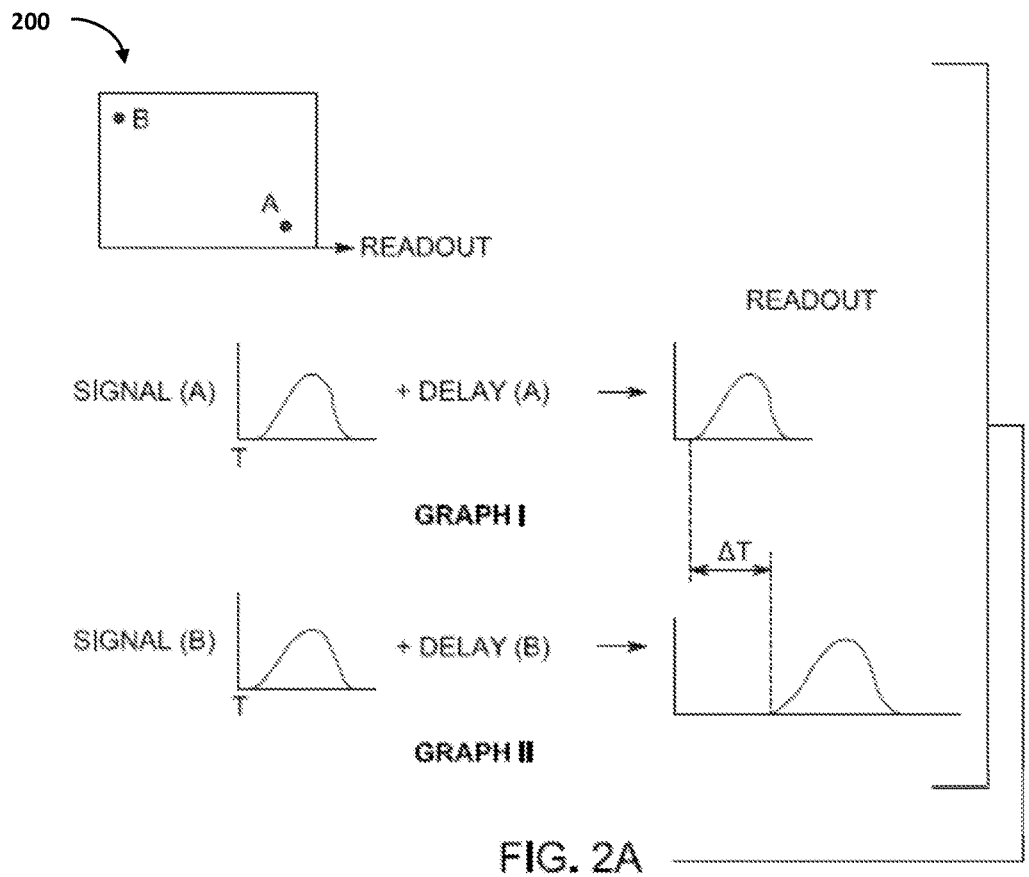
FIGS. 2A-2B depict microcell timing diagrams in accordance with embodiments.
Figure 2B:
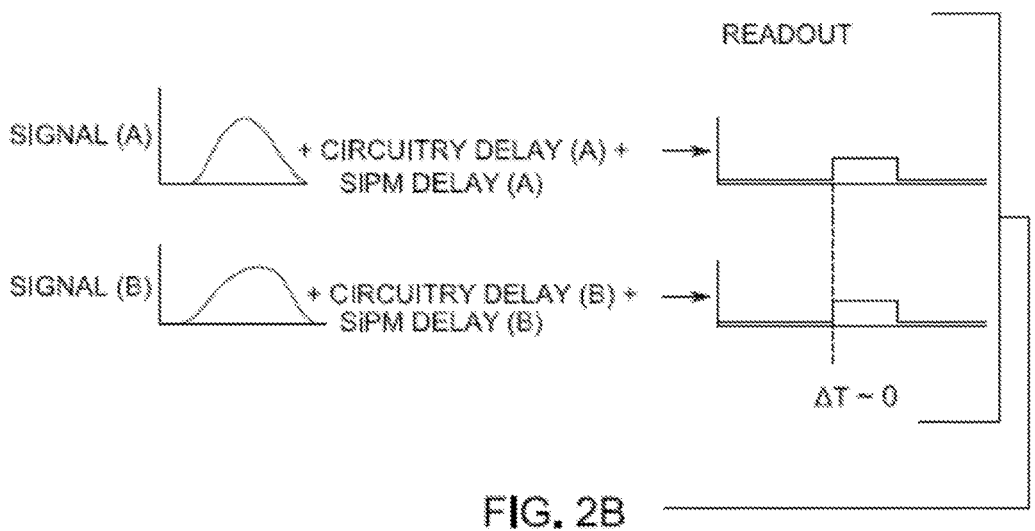

FIGS. 2A-2B depict graphical representations of microcell timing diagrams in accordance with embodiments. Photomultiplier 200 can be an array of microcells that includes microcell A and microcell B. The former microcell is located close to the array output that provides a signal to the readout electronics. The later microcell is geometrically located further from the array output, and its output has additional trace paths to travel before reaching the array output.

By way of example, if microcell A and microcell B simultaneously sensed the photon event and generated their respective avalanche signals at the same moment (as depicted in graphs I and II), the microcell output signals would each be delayed by differing delays delay(A), delay (B) due to the physical phenomenon of their respective array geometries and positions. Accordingly, the respective readout signals from microcells A, B would arrive at the readout circuitry with a time delay AT. FIG. 2B graphically depicts the general solution of correcting at the microcell level by adjusting and/or adding circuitry delay designed to compensate for the respective device delays SiPM delay(A), SiPM delay(B). This approach results in about a zero time delay AT.

In accordance with embodiments, variations between microcell signal delays of an array of microcells can be modified by adjusting the threshold level Vth at which the individual microcell comparator is triggered. Microcells with higher trigger levels would have an additional delay compared to microcells with a lower trigger level. In other embodiments, adjustment to the width of the one-shot pulse can be achieved. The start time of the pulse could remain about the same, but the pulse duration would move the end time. The processing electronics would then trigger on the falling edge rather than the rising edge of the output pulse. In another embodying implementation, a digital delay can be added to the pulse. In other implementations the amplitude and shape of the avalanche output pulse can be changed by altering the quench circuit time constant. By changing the rising slope of the avalanche output, additional time delay is introduced before the avalanche output crosses the threshold voltage Vth at signal sensing node 108.

In another implementation to equalize delays between microcells, the quench resistor value or other properties of the microcell can be adjusted at the individual microcell level to alter the rising edge of avalanche output pulse 74, 92, which in turn would alter the time that the signal at sensing node 108 reaches threshold level Vth.

This approach of changing the RC time constant to modify the avalanche pulse amplitude and shape is appropriate for analog SiPMs. Signals reaching the processing electronics would then reach a given trigger threshold at about the same total time after a photon event. This is only appropriate if the timing trigger is expected to come from a single microcell, but if a SSPM pixel is separated into several smaller sub-pixels it is to be expected that for each event very few microcells will contribute to timing in each sub-pixel. If each sub-pixel has its own independent timing signal this approach may be appropriate given its simplicity.

Figure 4A:
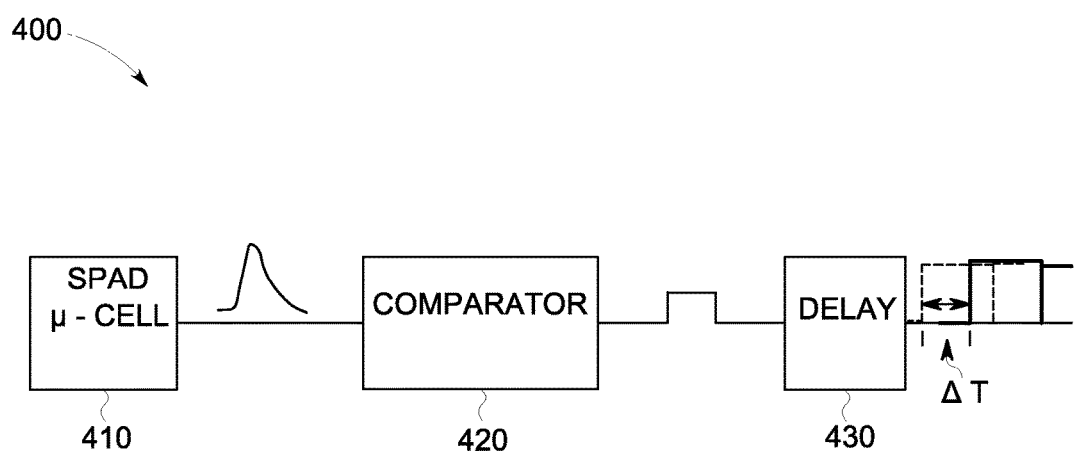
FIG. 4A depicts microcell circuitry in accordance with embodiments.

FIG. 4A depicts a model of microcell circuitry 400 in accordance with embodiments. Microcell circuitry 400 can include SPAD microcell 410 that produces an avalanche output. This avalanche output is provided to a signal sensing node of comparator 420, which produces a pulse output if a threshold voltage is exceeded by the avalanche output. In some implementations, a one-shot circuit can be incorporated into the signal path of microcell circuitry 400. For purposes of this discussion, the one-shot circuitry can be considered to be within the comparator block.

In accordance with embodiments, delay circuitry 430 introduces delay AT to the pulse output. The amount of delay is determined by the amount of compensation each microcell output needs based on its geometry and position in the microcell array.

In accordance with embodiments, value and design of existing components on the silicon wafer can be modified during fabrication of SiPM in a way that reduces transit time delay variation across the region of interest. This approach achieves adjustments without either reducing the active area of the sensor or adding complexity to the readout electronics. Variable delay between microcells can be introduced in each respective microcell (after comparator trigger). In accordance with some implementations, the threshold of the trigger Vth is set equal at an optimal value to minimize timing jitter. The variable delays can be implemented "by design" and included during fabrication of the microcell circuit wafer. The design can include passive and/or active components with values dependent on microcell location within the detector array (e.g., trace length to collecting node).

Figure 3B:
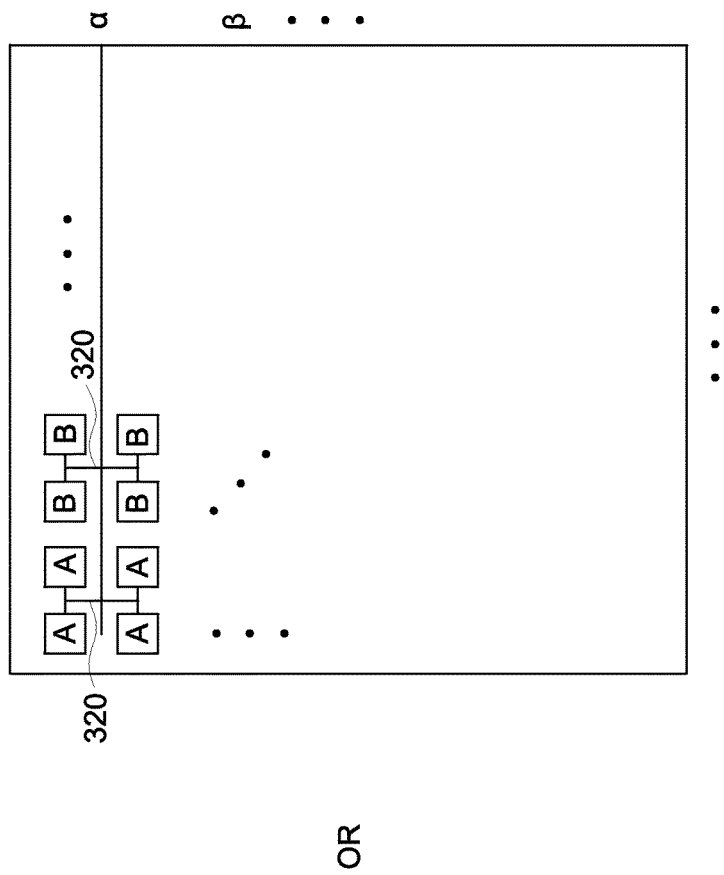
FIGS. 3A-3C depict alternate configurations for an array of microcells in accordance with embodiments.
Figure 3A:
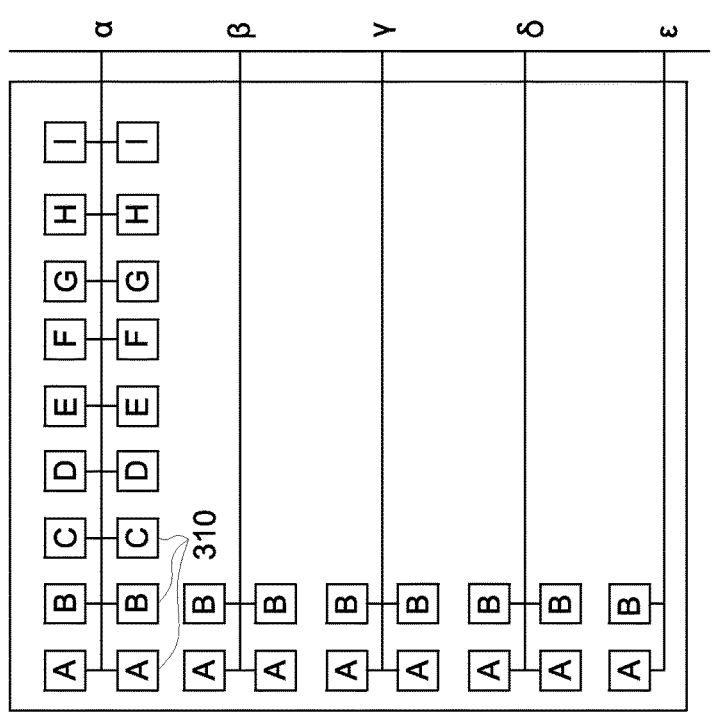
Figure 3C:
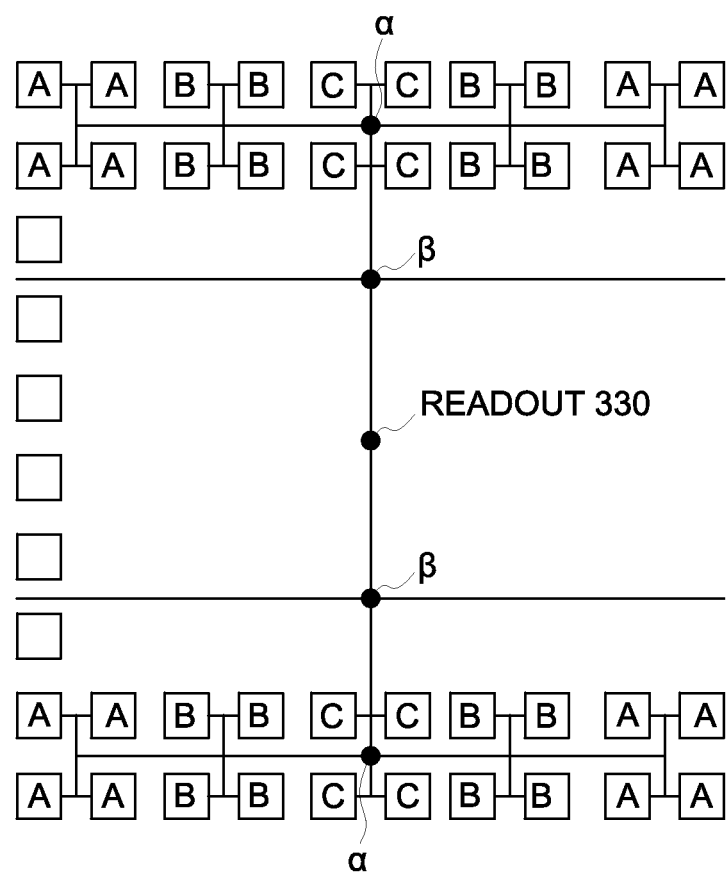

FIGS. 3A-3C depict alternate configurations for an array of microcells 310 in accordance with embodiments. Microcells 310 are arranged in columns A, B, C, . . . , where adjacent rows of microcells are summed to readout lines α, β, γ, . . . (FIG. 3A). In an alternate configuration, groups of microcells 310 are summed at a common centroid 320, and this summation is then summed on readout lines α, β, γ, . . . (FIG. 3B). In another configuration, readout lines α, β, γ, . . . can be located at a common centroid along the row (FIG. 3C), where the readout lines are summed and then provided to common readout output 330 that is located at a common centroid. In the configuration of FIG. 3C, the readout lines have mirror image delay introduced with respect to their position from the common readout output. Each of the configurations depicted in FIGS. 3A-3C introduce different delays to the signals from each of the microcells. Readout lines α, β, γ, . . . are connected to a summer (not shown). The path length from the respective outputs of readout lines α, β, γ, . . . to the summer input introduce another level of delay which differs for each readout line.

In accordance with embodiments, delay adjustment and compensation can be introduced based on the particular delay for each respective microcell based on the particular configuration of the microcell array. For example, all microcells in column B of each configuration would receive identical microcell-level delay compensation. In accordance with embodiments, the greatest delay can be introduced into the microcells closest to the readout line output. In some implementations a second level of delay compensation can be added at the column level to account for delay introduced by the positioning of the readout line output relative to the summer input.

Because the delay propagation can be identified for a row and a column, each of the delay components (row, column) can be corrected separately. This would require two levels of delay compensation, but simplify the implementation. Accordingly, embodiments can provide row-column delay compensation.

Embodying systems are not limited to the configurations depicted in FIGS. 3A-3C, and other configurations are within the contemplation of this disclosure.

Figure 4B:
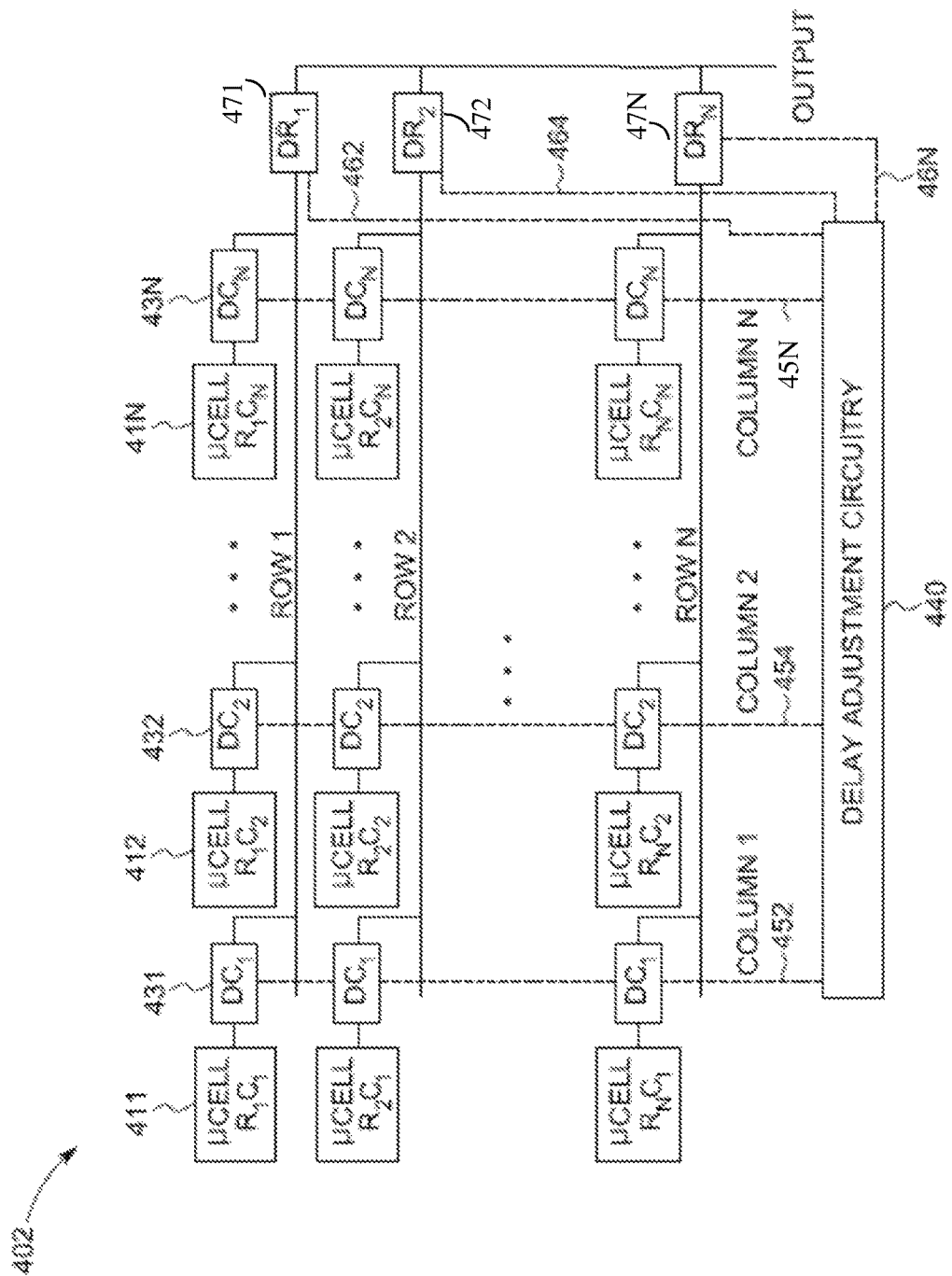
FIG. 4B depicts a microcell array incorporating the microcell circuitry of FIG. 4A in accordance with embodiments.

FIG. 4B depicts a layout for microcell array 402 in accordance with embodiments. Microcell array 402 can include M×N microcells arranged in rows and columns. Each microcell has a different delay—one part of the delay corresponds to propagation delay along respective row traces and the other along major bus column traces. Accordingly, each row microcell 411, 412, . . . , 41N has about the same additional "row" delay as other microcells of the same row. In accordance with embodiments, respective column delay circuits 431, 432, . . . , 43N are placed at the output of each microcell. In some implementations, there are also respective row delay circuits 471, 472, . . . , 47N are placed at the row output. The row and column delay circuits can be adjusted dynamically by delay adjustment circuitry 440.

In accordance with embodiments, delay adjustment circuitry 440, can provide respective delay correction values to each of the respective row and column delay circuits. These delay correction values are based on the adjustment and compensation of each microcell row and column computed by its position in the microcell array. The delay correction can be provided on a row and a column basis via respective row control lines 462, 464, . . . , 46N and respective column control lines 452, 454, . . . , 45N connected to each of the respective delay circuits. In accordance with implementations, the delay correction for microcells of the same column have about the same column delay adjustment. The column delay circuitry can be implemented in analog circuitry, in digital circuitry, by firmware, or a combination.

In accordance with embodiments, the delay correction values can be optimized by using delay adjustment circuitry 440, the adjustable row delay circuits, and the adjustable column delay circuits to optimize the signal transit delay across the photomultiplier for each microcell. These components of an active, onboard time delay compensation network can be used to reiteratively refine the amount of respective delay correction values for each of the respective row and column delay circuits.

Figure 5:
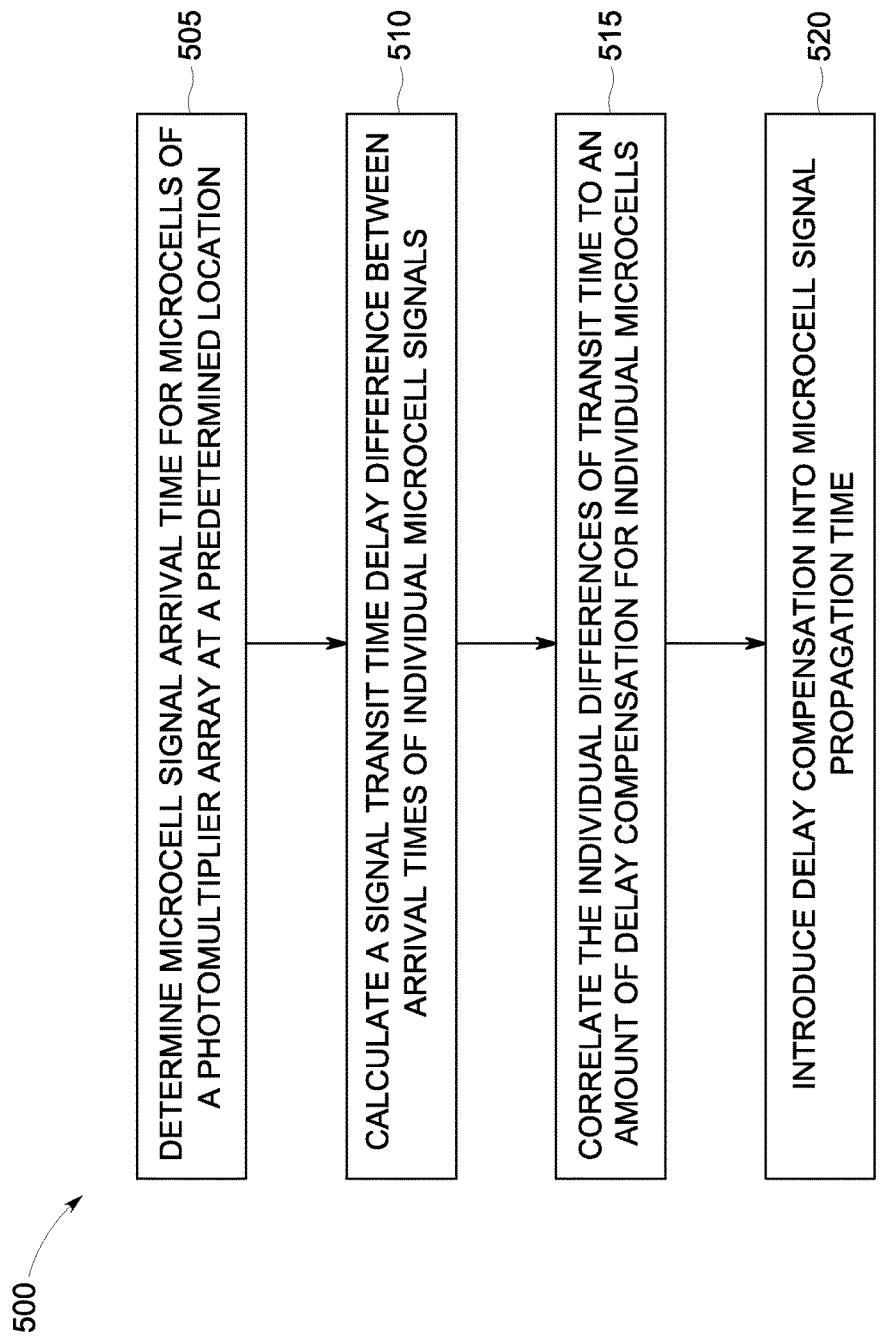
FIG. 5 depicts a process for compensating signal delay of microcells in accordance with embodiments.

FIG. 5 depicts process 500 for compensating signal delay across microcells of an array in accordance with embodiments. In accordance with embodiments, process 500 can modify the signal delay of individual microcells so that the pulse seen at the pixel output (e.g., at readout electronics and/or processing electronics) arrives at about the same time after a photon event regardless of the individual microcell location within a pixel array. The signal arrival time (e.g., transit time delay) of a microcell pulse at a preselected location is determined, step 505, for microcells of a SiPM array. The preselected location can be the output port, an input to the readout and/or processing electronics, or any signal path common to the individual microcells.

The differences between the microcell signal transit time delays at the preselected location is calculated for individual microcells of the array, step 510. The individual differences of transit time delay are correlated, step 515, to an amount of delay compensation needed for the respective individual microcells. In accordance with embodiments, the correlation can be based on the particular configuration of the microcell array. For example, all microcells in column B (FIG. 3) of each configuration could receive identical microcell-level delay compensation. The greatest delay can be introduced into the microcells closest to the readout output.

The delay compensation is introduced, step 520, into the microcell signal transit time for individual microcells. The delay compensation can level the transit time delay to the signal processing circuitry by adjusting one or more properties of the pulse at an individual microcell. Circuitry component modification and/or design change of existing components on the semiconductor wafer can be modified during fabrication at individual microcells based on the amount of delay compensation.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as compensating signal delay across a photomultiplier, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for compensating signal delay across a solid state photomultiplier, the method comprising:
    determining respective microcell output pulse arrival times of signals from a plurality of microcells of the photomultiplier;
    calculating a signal transit time delay difference between the respective microcell output pulse arrival times for individual signals;
    correlating the individual transit time delay differences to an amount of respective signal propagation compensation for respective microcells of the photomultiplier; and
    introducing, by a delay adjustment circuit, the respective signal propagation compensation into at least one of column delay circuits located at an output of each of the plurality of microcells and row delay circuits located at an output of each row of the plurality of microcells, the delay adjustment circuit connected to at least one of each column delay circuit and the each row delay circuit of the respective microcells, the respective signal propagation compensation adjusting one or more properties of the respective microcell output pulse at an individual microcell.

2. The method of claim 1, including determining the respective microcell output pulse arrival times at a preselected location within the photomultiplier.

3. The method of claim 2, including selecting the preselected location to be one of an output of the photomultiplier, an input to readout electronics, and a location common to a signal path of the plurality of microcells.

4. The method of claim 1, the signal propagation compensation causing subsequent signals from each of the plurality of microcells to arrive at a preselected location within the photomultiplier with about the same transit time delay.

5. The method of claim 1, including correlating the individual transit time delays based on a configuration of the photomultiplier.

6. The method of claim 1, the respective signal propagation compensation including adjusting at least one property of a pulse generated by each of the plurality of microcells.

7. The method of claim 6, including selecting the at least one property from one of adjusting a trigger level of a one-shot pulse circuit within each of the plurality of microcells, adjusting an internal delay of the one-shot pulse circuit, and adjusting a pulse width of the one-shot pulse circuit.

8. The method of claim 6, including selecting the at least one property from one of adjusting a response shape of a microcell within each of the plurality of microcells, and varying quench circuit component values of a quench circuit within each of the plurality of microcells.

9. The method of claim 8, the photomultiplier having a comparator connected to each of the signals from the plurality of microcells, the method including setting a trigger threshold of the comparator to trigger the comparator at about a same time delay for each of the signals from the plurality of microcells.

10. The method of claim 1, the respective signal propagation compensation including modifying circuit design values of each of the plurality of microcells during fabrication of a semiconductor wafer of the photomultiplier.

11. The method of claim 1, including:
fabricating at least one of row delay circuits for each row of the photomultiplier and column delay circuits for each column of the photomultiplier;
the correlating transit time delay differences including correlating at one of a row level and a column level; and
providing the respective signal propagation compensation to at least one of the row delay circuits and the column delay circuits.

12. A non-transitory computer-readable medium having stored thereon instructions which when executed by a processor cause the processor to perform a method of compensating signal delay across a photomultiplier, the method comprising:
determining respective microcell output pulse arrival times of signals from a plurality of microcells of the photomultiplier;
calculating a signal transit time delay difference between the respective microcell output pulse arrival times for individual signals;
correlating the individual transit time delay differences to an amount of respective signal propagation compensation for respective microcells of the photomultiplier; and
introducing the respective signal propagation compensation into circuitry of the respective microcells, the respective signal propagation compensation adjusting one or more properties of the respective microcell output pulse at an individual microcell.

13. The non-transitory computer-readable medium of claim 12, including instructions to cause the processor to determine the respective microcell output pulse arrival times at a preselected location within the photomultiplier.

14. The non-transitory computer-readable medium of claim 12, including instructions to cause the processor to correlate the individual transit time delays based on a configuration of the photomultiplier.

15. The non-transitory computer-readable medium of claim 12, including instructions to cause the processor to adjust at least one property of a pulse generated by each of the plurality of microcells based on the respective signal propagation compensation.

16. A system for compensating signal delay across a photomultiplier, the system comprising:
a plurality of microcells within the photomultiplier, the plurality of microcells arranged in rows and columns;
at least a subset of the plurality of microcells generating a respective microcell output pulse signal representative of a photon event detection;
at least one of column delay circuits located at an output of each of the plurality of microcells, and row delay circuits located at an output of each row; and
a delay adjustment circuit connected to at least one of each column delay circuit and each row delay circuit, the delay adjustment circuit configured to provide respective delay correction values to at least one of the column delay circuits and the row delay circuits, the delay correction values adjusting one or more properties of the microcell output pulse signal at an individual microcell.

17. The system of claim 16, including the delay adjustment circuit providing about the same delay correction value to microcells of a same row.

18. The system of claim 16, including the delay adjustment circuit providing about the same delay correction value to microcells of a same column.

19. The system of claim 16, including the delay adjustment circuit providing respective delay correction values to each of the plurality of microcells based on a configuration of the photomultiplier.

20. The system of claim 16, including a comparator connected to each of the plurality of microcells, and a trigger threshold of the comparator configured to trigger the comparator at about a same time delay for each of the signals from the subset of the plurality of microcells.

* * * * *